Nov. 4, 1969    E. H. LUDEMAN    3,476,154
DUST-CAP
Original Filed Oct. 11, 1966    4 Sheets-Sheet 1

INVENTOR.
Edwin H. Ludeman
By Davis, Hoxie, Faithfull & Hapgood
Attorneys

Nov. 4, 1969     E. H. LUDEMAN     3,476,154
DUST-CAP
Original Filed Oct. 11, 1966     4 Sheets-Sheet 2

INVENTOR.
Edwin H. Ludeman
By Davis, Hoxie, Faithfull & Hapgood
Attorneys

United States Patent Office 3,476,154
Patented Nov. 4, 1969

3,476,154
DUST-CAP
Edwin H. Ludeman, Red Bank, N.J., assignor to Andrews Industries Incorporated, Dayton, N.J., a corporation of New Jersey
Continuation of application Ser. No. 585,960, Oct. 11, 1966. This application Dec. 18, 1968, Ser. No. 786,829
Int. Cl. F16l 59/10; B65d 59/06
U.S. Cl. 138—89                                    8 Claims

ABSTRACT OF THE DISCLOSURE

A dust-cap for covering an open pipe fitted with a coupling adaptor is provided with fixed and movable camming surfaces and an actuator member rotatable about a vertical axis to cause relative horizontal and vertical motion of the cap with respect to the adaptor to compress a sealing gasket as the cap is secured in place by rotation of the actuator.

---

This application is a continuation of Ser. No. 585,960, filed Oct. 11, 1966.

The present invention relates to improvements in conduit end fittings for hose and the like which are quickly attachable and detachable.

Such end fittings may take the form of coupling devices and may be employed to connect a hose to a storage tank for filling thereof. A typical device comprises a female coupling member having one or more camming devices associated with hand levers and a male adaptor member having a cam receiving annular groove such that upon assembly of the female coupling member with the adaptor manipulation of the levers will cause the associated cam to engage the groove of the adaptor to draw the coupling into intimate sealing contact with the adaptor.

The female coupling member is usually associated with the flexible hose which is used to connect the tank having the male adaptor with a supply vehicle such as a tank truck transporter. After transfer of fluid material from the supply to the storage tank fitted with the male adaptor, it becomes necessary to seal the fill pipe and adaptor against intrusion of dirt, etc.

The present invention is particularly concerned with a closure member called a dust-cap which performs the job of sealing the adaptor and its associated fill pipe of the storage tank after filling thereof.

Such a dust-cap must be exceedingly rugged, inexpensive, readily positioned, and easily locked in place, preferably by the operation of a single lever. Many storage tank installations locate the fill pipe and the associated male adaptor within a manhole thereby severely restricting the space available to operate the locking mechanism. Wear of the contacting surfaces of the cap and the adaptor should be avoided to prolong their life. The cap must maintain adequate sealing with the adaptor under the conditions of manhole flooding and freezing.

The dust-cap of the present invention is easily positioned on the male adaptor member, and is easily locked into sealing engagement with the adaptor by means of a single self-locking lever which operates wholly within the dimensional limits of the cap and thus permits utilization of the cap within restricted spaces. Furthermore, the dust-cap of the present invention provides line contact between the actuating surfaces of the cap and the groove of the adaptor thereby reducing the wear of these surfaces ordinarily suffered with the point contact characteristic of prior art dust-caps. Moreover, the dust-cap of the present invention provides an air lock to exclude water from the interior of the cap body to prevent freezing of the cap to the adaptor.

Figure 2:
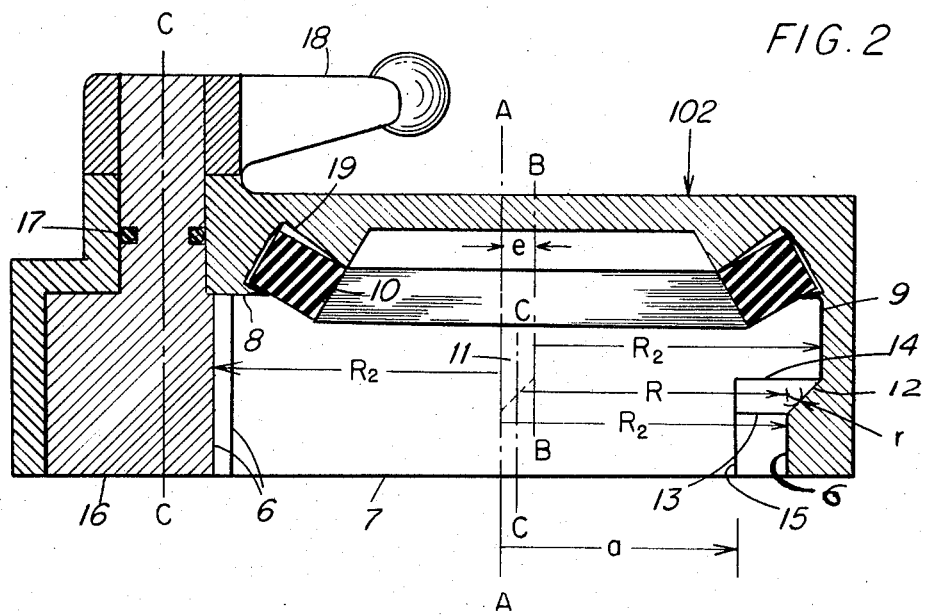
Figure 1:
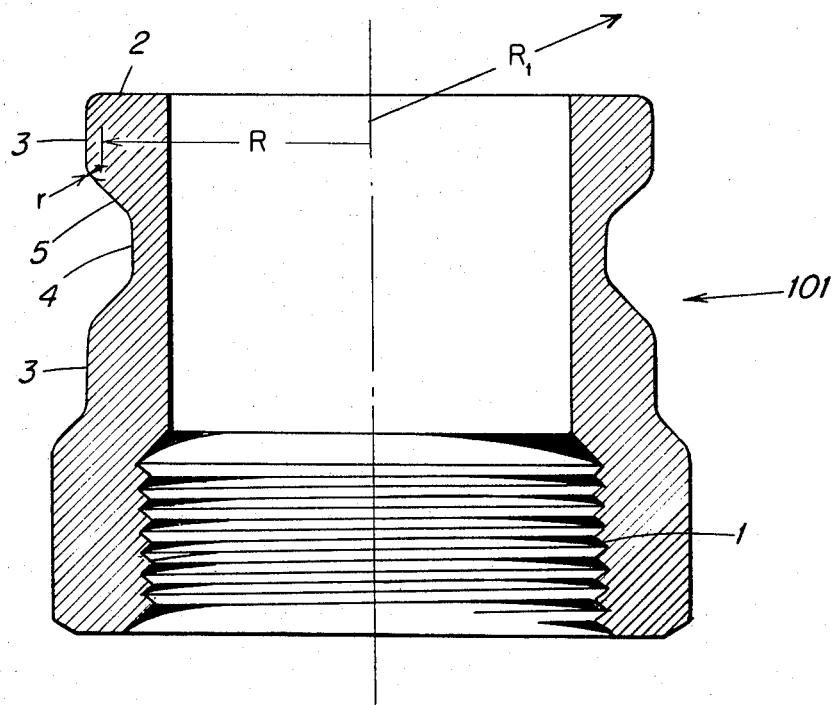
Figure 3:
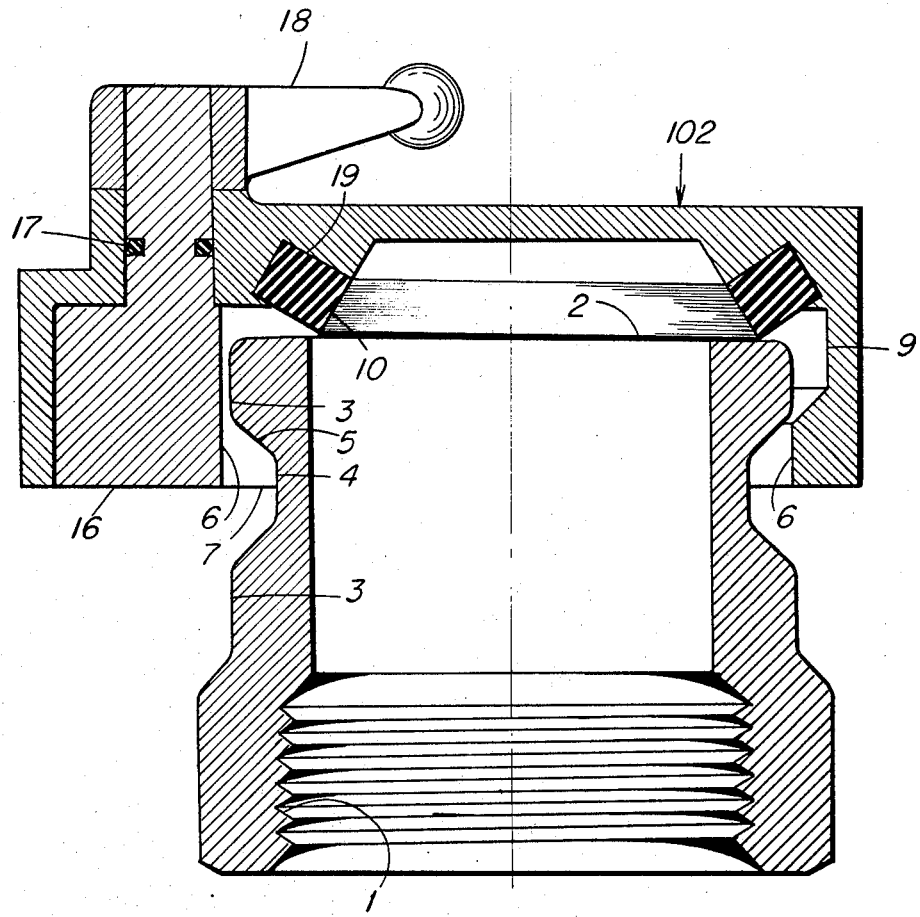
Figure 4:
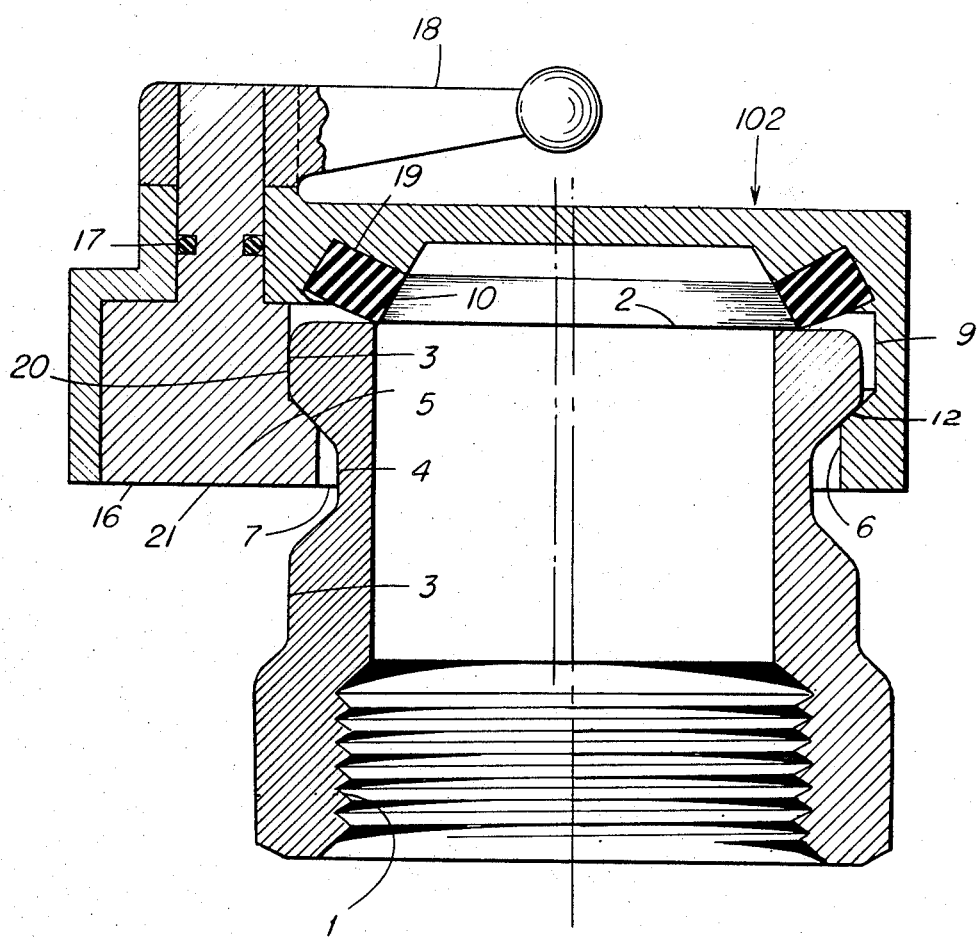
Figure 5:
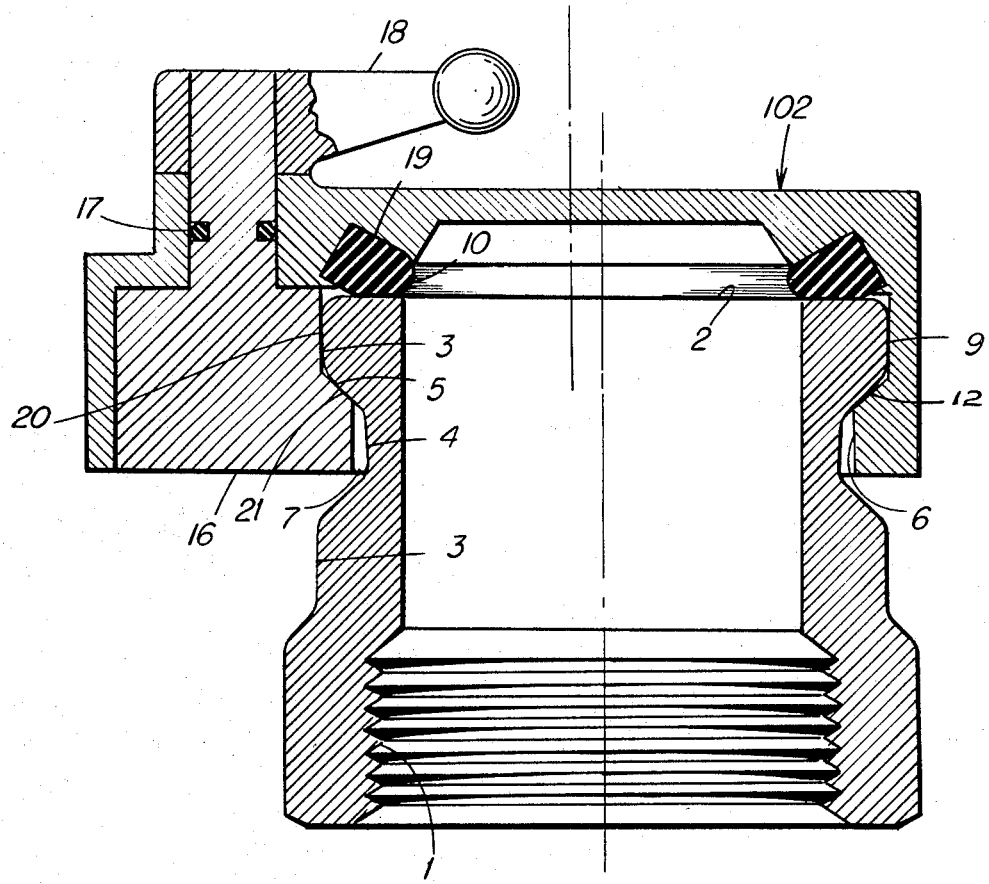
Figure 6:
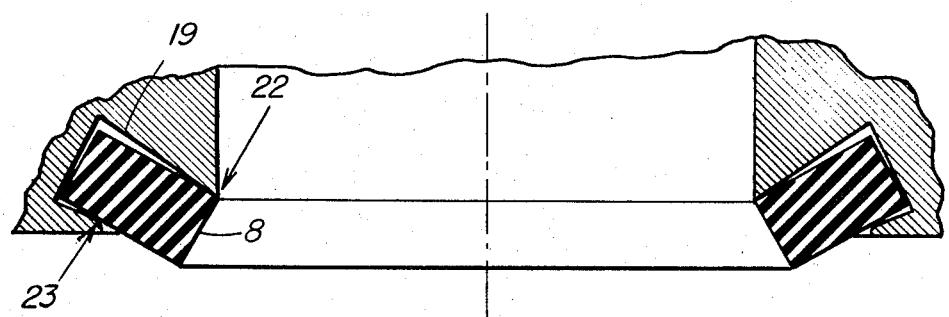

In the drawings:
FIG. 1 is a sectional view of the male adaptor member;
FIG. 2 is a sectional view of the dust-cap of a coupling in according with the invention;
FIG. 3 is a sectional view of the dust-cap positioned on the male adaptor member;
FIG. 4 is a sectional view of the dust-cap and the male adaptor member in a partially connected state;
FIG. 5 is a sectional view of the dust-cap and the male adaptor member in a fully connected state; and
FIG. 6 is a partial cross-section of the gasket and shaped groove of the dust-cap.

FIG. 1 illustrates the configuration of the conventional construction of a male member 101.

The adaptor member 101 is a tubular structure provided with a pipe thread 1 at one end and a flat sealing surface 2 at the other. This surface, when forced against an elastomeric gasket in the dust-cap or the female hose coupling member, effects a fluid tight seal. Defined on the outer surface 3 is a groove 4. The surface 5 of this groove is used as a camming surface. The forces that effect the gasket compression and resist axial force due to pressure are applied to this surface.

Preferably radius $R_1$ is less than the bore of the female member to allow positioning the coupling members without precise initial axial alignment.

The dust-cap 102 is shown in the disconnected state in FIG. 2. As can be seen, it is a concave member bored out on several axes. Surface 6 is a cylindrical surface of radius $R_2$ with axis A—A. ($R_2$ is greater than $R_1$ of FIG. 1 by the radial clearance desired.) Surface 6 extends axially from surface 7 to surface 8. It is within this cylinder that the end of the male coupling member 101 is located when in the connectable position. Surface 9 is a cylindrical surface of radius $R_2$ with axis B—B. B—B is parallel to, but displaced from A—A by the amount $e$. It is within this cylinder that the end of the male member 101 is positioned when the male member 101 is connected. The annular elastomeric seal 10 is centered on B—B. Surface 11 is a small flat surface parallel to the plane of the paper connecting surface 6 and surface 9. Surface 12 is generated by a sphere of radius $r$ rotating at the radius R of FIG. 1 about an axis C—C, as axis C—C moves lineally from coincidence with axis A—A to coincidence with axis B—B, and then, for clearance, slightly beyond. Simultaneously, generating sphere moves upwards at a proportional rate from intersection 13 to intersection 14. Surface 12 extends circumferentially until it is interrupted by surface 15. Surface 15 is at a distance $a$ from axis A—A.

A small value of $a$ makes it necessary that, during removal, the axes of the dust-cap 102 and male member 101 be kept closely parallel to avoid wedging on the skewed surface near the center of the dust-cap 102. Here, this surface is steeply slanted and this produces very unfavorable pressure angles. A sufficiently large value of $a$ prevents any wedging and allows the dust-cap 102 to be removed with random motion. Therefore, surface 12 is limited to a relatively small arcuate extent. However, surface 12 extends sufficiently far to provide a line contact between the adaptor groove and surface 12. Line contact reduces wear and stress from that present in the situation of point contact which obtains with the use of a simple hook.

Parallel to axis A—A is cam axis C—C. The cam 16 is a stepped cylinder cut away on radius $R_2$ to allow entrance of the male member 101 into the dust-cap 102, and further shaped to provide the two cam surfaces, a radially acting surface and an angularly acting surface. These cam surfaces may be generated by a milling cutter whose envelope is identical with that of the male coupling member 101 and whose position with respect to the cam varies identically as that desired for the male coupling member 101 during connection plus an extension of that motion.

The cam is grooved to provide for a ring type elastomeric seal 17. A lever 18, affixed to the cam, provides means for rotating the cam.

The annular compression gasket 10, flat in its unstressed condition, is canted into the conical or dished shape shown by means of the shaped groove 19.

FIG. 3 shows the dust-cap 102 and male member 101 in a connectable position. Note that the dust-cap 102 is positionable upon the male member 101 on an axis parallel to, and only slightly displaced from, the axis of the connected coupling, and that a relatively large initial angular misalignment in any direction is allowable. Also note that the cap 102 can be removed with equal ease.

This is in contrast to most couplings of this type which require the user to first engage a hook at one side of the coupling by careful orientation of the members.

FIG. 4 shows the relative position of the members after the cam 16 has been rotated sufficiently to take up clearance. The dust-cap 102 has been shifted sideways by the radially acting cam 20, and the surface 12 brought into just touching contact with the male member 101. The angular acting cam 21 is likewise brought in just touching contact with the male member 101.

FIG. 5 shows the relative position of the members with maximum gasket compression. The radial cam 20, and angular cam 21 are so designed that, in addition to producing axial and lateral movement, they also maintain during compression the axis of the dust-cap 102 and the axis of the male member 101 parallel. By so doing line contact is obtained between the male member and the surface 12 and destructive point contact stresses on this member are avoided.

The cam 16 may be rotated slightly further before it reaches its stop. This additional rotation carries the members through their point of maximum displacement to a more relaxed condition. Unlocking motion, therefore, must again maximally displace the members. This "over center" effect provides a self-locking action.

The dust-cap of the present invention thus engages the adaptor with a motion having axial and radial components. The fixed and movable camming surfaces cause equal motion of both sides of the cap with respect to the adaptor. Thus, gasket compressive forces are equally distributed about the sealing surface to provide a seal of maximum effectiveness. The cap is easily placed in position without alignment. The controlled motion afforded by the camming surfaces insures maintenance of line contact by preventing tilting of the cap with respect to the adaptor.

The exposed location of many manholes creates problems of flooding and subsequent freezing. Under these circumstances it is desirable to prevent ice from forming within the dust-cap 102 and around the cam 18. This is done by sealing the shaft of the cam 16 with annular seal 17 of FIG. 2. Water rising in the manhole traps air in the dust-cap 102. Since this air cannot escape, the air lock thus formed prevents any significant rise of water into the dust-cap 102. Thus, no water enters the region of the gasket. Freezing therefore does not impair the operation of the cap.

It is desirable to use a flat gasket of standard configuration. However, such a gasket requires, for this application, an excessive force to produce the minimum axial compression required by considerations of sealing, machine tolerances, wear, etc. Further, when left undisturbed for long periods, they tend to adhere to the male member 101 and make removal of the dust-cap 102 difficult.

By using a groove designed to force a flat gasket into a dished shape as shown in FIG. 2, these defects and difficulties are avoided or minimized. Adequate axial compression is easily obtained without excessive force. Also, there is a strong tendency for the gasket itself to break any bond because any gasket so bonded is deformed with the center portion of the contact area under compression and with the portions on either side of the center are under counterbalancing tension. This tension tends to tear the gasket free from the engaging surface.

A further advantage is shown schematically in FIG. 6. Due to distortion of the gasket by the groove, contact is maintained at points 22 and 23. This prevents dirt etc. from accumulating between the gasket and the seat.

I claim:

1. A dust-cap for a coupling adaptor having a coupling attachment groove, said cap having a compressible sealing gasket, a fixed cam having a surface adapted for engagement with a first exterior portion of the adaptor member, and a rotatable cam adapted for engagement with a second exterior portion of said adaptor at a position opposed to said first portion, said rotatable cam rotating about an axis parallel to the axis of the adaptor and exteriorly of said second exterior portion of said adaptor, said rotatable cam being comprised of a first radially acting camming surface for engagement with the peripheral surface of the adaptor at a position above the adaptor groove for moving the cap radially with respect to the adaptor to bring the fixed cam surface into engagement with said first exterior portion of the adaptor upon rotation of said cam, and a second anngularly acting camming surface for engagement with the groove of the adaptor for moving the cap in a direction having an axial component with respect to the adaptor whereby said cap moves, with respect to said adaptors, first radially and then in a direction having an axial component upon rotation of said cam.

2. A dust-cap as in claim 1 wherein said fixed camming surface is of finite extent to thereby establish line contact, as opposed to point contact, with said adaptor member, said path of predetermined motion preserving such line contact whereby wear of the contacting surfaces is reduced.

3. A dust-cap as claimed in claim 1 wherein the axis of the dust-cap and the axis of the adaptor are maintained parallel during relative movement by virtue of a complementary relationship of the cams.

4. A dust-cap as claimed in claim 1 wherein sealing means are provided for said movable cam to entrap air within the cap to preclude the entry of water.

5. A dust-cap for use with a cylindrical adaptor member having an exterior coupling attachment groove, said dust-cap having a compressible gasket for establishing a seal with the adaptor member, a fixed cam having a surface for engagement with a portion of the groove of the adaptor such that the fixed cam surface establishes line contact with the adaptor, and a rotatable cam having an axis of rotation parallel to the axis of and exteriorly of said adaptor, said rotatable cam having a first camming surface for engagement with the cylindrical exterior of the adaptor and a second camming surface for engagement with the groove, said fixed cam surface and said first and second camming surfaces of said rotatable cam thereby providing upon rotation relative motion of said dust-cap and said adaptor first in a radial direction and then in a direction having an axial and a radial component to exert evenly distributed gasket compressive forces.

6. A conduit end fitting for use with a coupling adaptor, said end fitting having a compressible sealing gasket, a fixed camming surface adapted for engagement with a first exterior portion of the adaptor member, and a cam rotatable about an axis parallel to the axis and exteriorly of said adaptor member and adapted for engagement with a second exterior portion of said adaptor member at a position diametrically opposed to said first portion, said rotatable cam having a first camming surface providing relative radial movement firstly, and a second camming surface providing relative axial movement secondly between the conduit end fitting and the adaptor member along a predetermined path to evenly compress said gasket.

7. The dust-cap of claim 1 wherein said rotatable cam can be rotated beyond the point where the rotatable cam maximally compresses said gasket to a point where the gasket is less compressed to provide a self-locking action for the rotatable cam.

8. The dust-cap of claim 1 wherein the compressible sealing gasket is an elastomeric annular ring of rectangular cross-section, which ring is canted into a portion of a cone so as to initially present an edge to the surface of the adaptor against which said gasket seals.

References Cited

UNITED STATES PATENTS

| 1,346,879 | 7/1920 | Child | 285—8 X |
| 2,069,216 | 2/1937 | Clark | 285—8 |
| 1,734,372 | 11/1929 | Graham. | |
| 2,281,145 | 4/1942 | Duey | 138—89 |
| 2,729,231 | 1/1956 | Quest. | |
| 3,118,561 | 1/1964 | Klaus | 220—55 |

HERBERT F. ROSS, Primary Examiner

U.S. Cl. X.R.

220—46; 285—122